US 9,695,976 B2

(12) United States Patent
Hill et al.

(10) Patent No.: US 9,695,976 B2
(45) Date of Patent: Jul. 4, 2017

(54) TRAFFIC SIGNAL MOUNTING BRACKET (71) Applicant: TRAFFIC HARDWARE + DESIGN INC., Toronto (CA)

(72) Inventors: Jayson Alan Hill, Markham (CA); Mladen Halar, Mississauga (CA)

(73) Assignee: TRAFFIC HARDWARE + DESIGN INC., Toronto, Ontario (CA)

( * ) Notice: Subject to any disclaimer, the term of this patent is extended or adjusted under 35 U.S.C. 154(b) by 0 days.

(21) Appl. No.: 14/935,873

(22) Filed: Nov. 9, 2015

(65) Prior Publication Data

US 2016/0131347 A1    May 12, 2016

Related U.S. Application Data

(60) Provisional application No. 62/076,820, filed on Nov. 7, 2014.

(30) Foreign Application Priority Data

Jun. 4, 2015   (CA) ...................................... 2893727

(51) Int. Cl.
| | |
|---|---|
| *A47B 96/06* | (2006.01) |
| *F16M 13/02* | (2006.01) |
| *F16B 2/08* | (2006.01) |
| *F16B 2/12* | (2006.01) |
| *F16B 7/04* | (2006.01) |
| *F16B 43/02* | (2006.01) |
| *E01F 9/65* | (2016.01) |

(52) U.S. Cl.
CPC ............. *F16M 13/022* (2013.01); *E01F 9/65* (2016.02); *F16B 2/08* (2013.01); *F16B 2/12* (2013.01); *F16B 7/0493* (2013.01); *F16B 43/02* (2013.01)

(58) Field of Classification Search
CPC ..... F21V 21/116; F21V 21/10; F16M 13/022; F21W 2111/02; F16L 3/1016; F16L 33/06
USPC .......... 248/214, 220.1, 229.17, 230.1, 230.5, 248/230.8, 230.9, 219.3; 24/277
See application file for complete search history.

(56) References Cited

U.S. PATENT DOCUMENTS

| | | | | |
|---|---|---|---|---|
| 1,413,818 | A * | 4/1922 | Wilkinson | ............. F16L 33/06 24/277 |
| 2,264,553 | A * | 12/1941 | Robinson | ................ F16L 41/06 248/230.1 |
| 2,634,939 | A * | 4/1953 | Voss | ......................... G01B 5/25 248/229.17 |
| 3,227,406 | A * | 1/1966 | Shelton | .................. F16L 3/1091 248/74.4 |
| 3,241,800 | A * | 3/1966 | Richter, III | ............ A47G 33/08 248/230.9 |
| 3,631,604 | A * | 1/1972 | Schenavar | ............... G01B 5/08 248/230.9 |
| 3,888,446 | A * | 6/1975 | O'Brien | ................ F16B 7/0486 248/230.1 |

(Continued)

*Primary Examiner* — Kimberly Wood (57) ABSTRACT

A traffic signal mounting bracket for mounting a traffic signal on a post. The mounting bracket has a base, a cable, and a traffic signal attachment portion. The base is spaced apart from the post to maintain separation between the back of the base and the post. The cable is secured against rotation in a channel on the back of the base and extends rearwardly from the back of the base to loop around a post and is clamped between the front of the base and clamping blocks releasably attached thereto.

9 Claims, 7 Drawing Sheets

(56) References Cited

U.S. PATENT DOCUMENTS

| | | | | |
|---|---|---|---|---|
| 4,423,556 | A * | 1/1984 | DiVelez | G01B 5/0002 |
| | | | | 248/230.9 |
| 4,460,142 | A * | 7/1984 | O'Rorke | F16B 2/08 |
| | | | | 248/214 |
| 4,489,910 | A | 12/1984 | Ferguson | |
| 4,569,497 | A * | 2/1986 | Elmer | F16B 2/08 |
| | | | | 248/180.1 |
| 4,659,046 | A * | 4/1987 | Parduhn | F21V 21/108 |
| | | | | 248/214 |
| 4,860,985 | A * | 8/1989 | Olson | F21V 21/116 |
| | | | | 248/214 |
| 4,917,338 | A * | 4/1990 | Olson | F21V 21/116 |
| | | | | 248/214 |
| 5,215,281 | A * | 6/1993 | Sherman | F16L 55/035 |
| | | | | 248/219.4 |
| 5,340,069 | A * | 8/1994 | Niemeyer | F21V 21/116 |
| | | | | 248/214 |
| 5,645,255 | A * | 7/1997 | Parduhn | F21V 21/116 |
| | | | | 248/214 |
| 6,357,709 | B1 * | 3/2002 | Parduhn | F21V 21/116 |
| | | | | 248/214 |
| 7,997,546 | B1 * | 8/2011 | Andersen | F16B 2/06 |
| | | | | 248/214 |
| 8,602,798 | B2 * | 12/2013 | Downing | F16L 3/00 |
| | | | | 248/65 |
| 8,985,535 | B1 * | 3/2015 | Townsend, Jr. | F16M 13/022 |
| | | | | 248/214 |
| 9,200,654 | B1 * | 12/2015 | Parduhn | F16B 7/0493 |
| 9,316,349 | B1 * | 4/2016 | Parduhn | E01F 9/016 |
| 9,322,536 | B1 * | 4/2016 | Parduhn | G08G 1/095 |

* cited by examiner

TRAFFIC SIGNAL MOUNTING BRACKET

FIELD OF THE INVENTION

This invention relates to traffic signal mounting brackets, in particular, to cable-type traffic signal mounting brackets. The bracket is operable to be attached to a post and serves as a platform on which a traffic signal may be mounted.

BACKGROUND

Mounting brackets are widely used to mount traffic signals, such as traffic lights, street signs, or other traffic control devices, to a variety of traffic posts. The size and type of traffic post is largely dictated by the application, for example, a large diameter post may be used to support an overhead sign above a highway, while a smaller diameter post may be used to support a pedestrian traffic signal adjacent a roadway.

The wide variety of posts presents a challenge to the design of a mounting bracket capable of accommodating a variety of traffic posts. Cables have been used to attach mounting brackets to traffic posts as a way of accommodating a wider range of posts, using a single mounting bracket. However, tightening cables on known mounting brackets to secure the mounting bracket in place on the post requires both hands or specialized tools to prevent the cable from twisting when a nut is tightened on the end thereof. Often, a worker installing a mounting bracket will need one hand to hold the mounting bracket in place on the post while tightening the cables.

Accordingly, there is a need for a traffic signal mounting bracket capable of accommodating a wide range of traffic posts. Further, there is a need for a traffic signal mounting bracket that may be tightened on a traffic post with one hand.

SUMMARY OF THE INVENTION

A traffic signal mounting bracket, according to the present invention, has a base with opposed sides, a front, and a back. A spacing flange on each side of the base extends rearwardly to engage a post and maintain separation between the base and a traffic post. A retaining flange adjacent each spacing flange defines a channel therebetween and a first slot in the base is aligned with each channel. A clamping block is releasably attached to the front of the base overlying each first slot with a bearing surface and a second slot aligned with the first slot. A cable having a bolt attached to each end is secured against rotation relative to the base and secured against the bearing surface by a fastener. The cable extends rearwardly from the back of the base to loop around a post and be clamped between the base and the clamping blocks to thereby secure the traffic signal mounting bracket in place. A traffic signal attachment portion is engaged with the front of the base and a traffic signal.

According to another aspect of the present invention, a method of attaching a traffic signal to a post includes positioning a base spaced apart from the post, rotationally securing each end of a cable relative to the base and pivotally attaching each end of the cable to the front of the base, such that the cable extends through the base and rearwardly from the back of the base, looping a middle portion of the cable around the post to secure the base to the post, frictionally securing the cable to the front of the base, attaching the traffic signal to a traffic signal attachment portion, and attaching the traffic signal attachment portion to the base.

BRIEF DESCRIPTION OF THE DRAWINGS

In order that the invention may be more clearly understood, it will now be described in detail by way of example, with reference to a preferred embodiment thereof and the accompanying drawings, in which.

DESCRIPTION OF THE INVENTION

As used in the present description, the term "traffic signal" includes any traffic light, traffic sign, road sign, or other traffic control device that is attached to a post. As used in the present description, the term "post" includes any traffic signal post, mast arm, or other extension thereof on which a traffic signal may be mounted.

The traffic signal mounting bracket has three components: a base 1 for attachment to a post, a cable 3 for attaching the base 1 to the post, and a traffic signal attachment portion 2 which attaches to and retains in place a traffic signal (not shown).

As shown in FIGS. 1, 2A, 2B, 3A, 3B, 4, 7, and 8, the base 1 is generally rectangular having a front 5 and a back 6. Flanges 7 are provided at each side of the base 1 and act as spacing flanges to engage against the post in order to maintain separation between the back 6 of the base 1 and the post. The flanges 7 extend a distance from the back 6 of the base 1 and, preferably, have a wide V-shaped edge 8, which may be provided with teeth 9 for better engagement with the post.

Spaced apart from each flange 7 is a retaining flange 10 having a width and a length. Preferably, as shown in FIGS. 3A, 3B, 7, and 8, the retaining flanges 10 are spaced inwardly a distance from the flanges 7 and their length is shorter than the length of the flange 7. The space between the retaining flanges 10 and flanges 7 defines an anti-rotation channel 11 therebetween. The purpose of the anti-rotation channel 11 is to prevent rotation of the head portion 14 of the bolt 13, as will be described further herein.

Figure 3A:
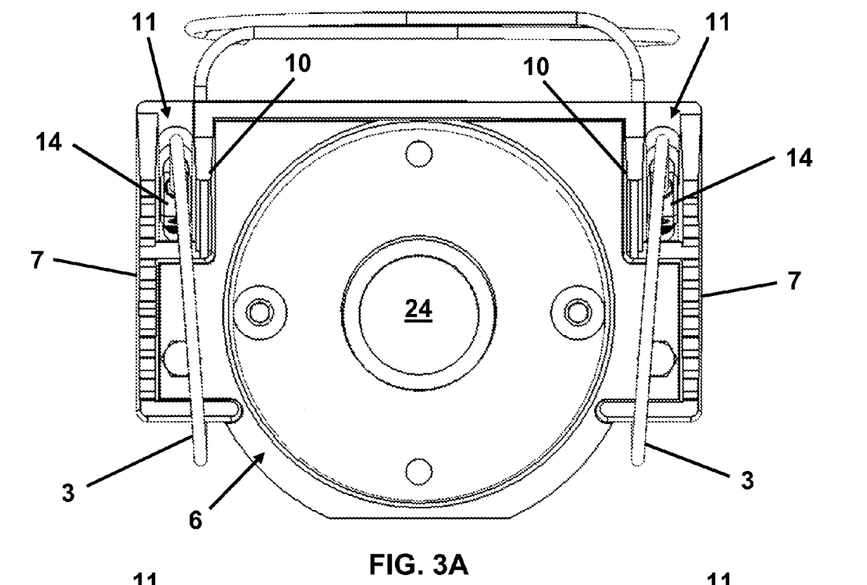
FIG. 3A is a rear view of the traffic signal mounting bracket.
Figure 5A:
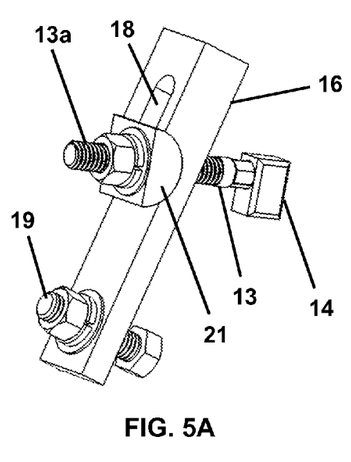
FIG. 5A is a perspective view of the clamping block, bolt, and threaded post of the traffic signal mounting bracket.
Figure 5B:
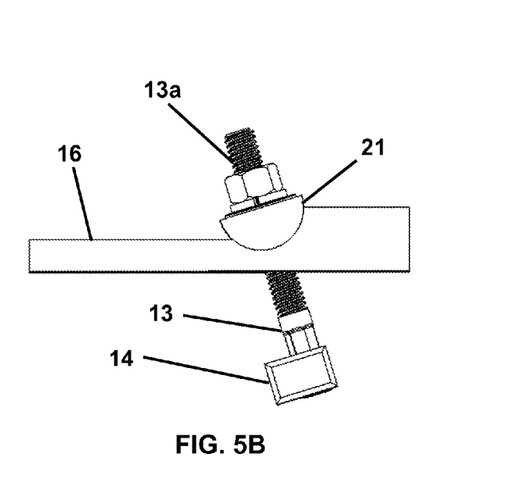
FIG. 5B is a side view of the clamping block and bolt of the traffic signal mounting bracket.
Figure 6A:
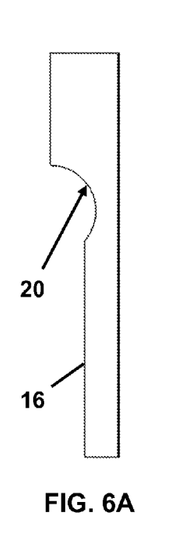
FIG. 6A is a side view of the clamping block of the traffic signal mounting bracket.
Figures 6B, 6C:
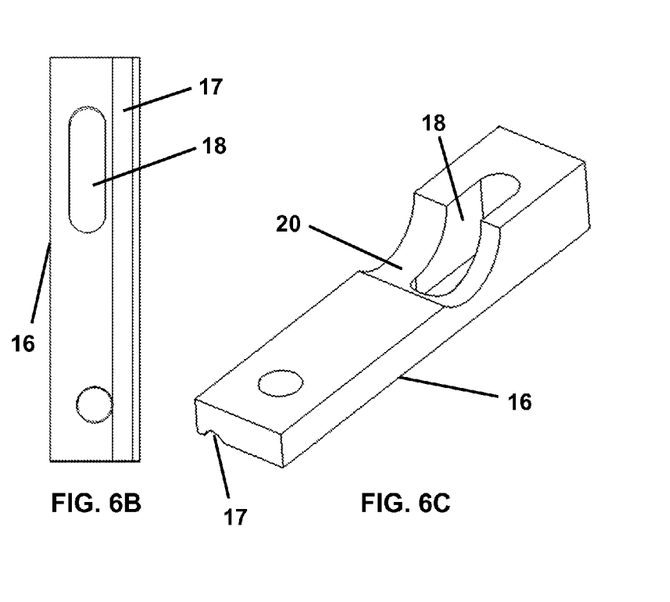
FIG. 6B is a rear view of the clamping block, shown in FIG. 6A, showing the clamping groove on the rear thereof.
FIG. 6C is a perspective view of the clamping block, shown in FIG. 6A.

The cable 3 consists of a length of wound steel wire, has a bolt 13, attached to each end, and is used to secure the base 1 to the post. The bolt 13 is attached to the cable 3 by means of a head portion 14 and has a threaded portion 13a extending therefrom. Preferably, as shown in FIGS. 3A, 5A, and 5B, the head portion 14 is a sleeve with a square-like cross-section that is secured to the bolt 13 by a set screw (not shown) to prevent rotation of the head portion 14 relative to the bolt 13. Alternatively, the head portion 14 may be formed integrally with the bolt 13. As will be described, the cross-section of the head portion 14 is sized to fit within the anti-rotation channel 11 and prevents rotation of the bolt 13, when a nut is tightened thereon.

Figure 3B:
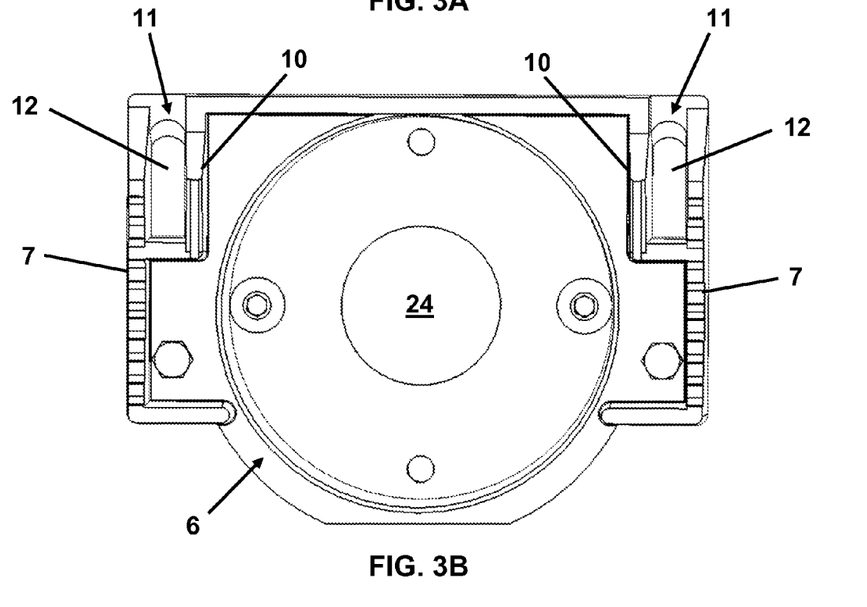
FIG. 3B is a rear view of the base of the traffic signal mounting bracket, as shown in FIG. 3A, without the other components.
Figure 7:
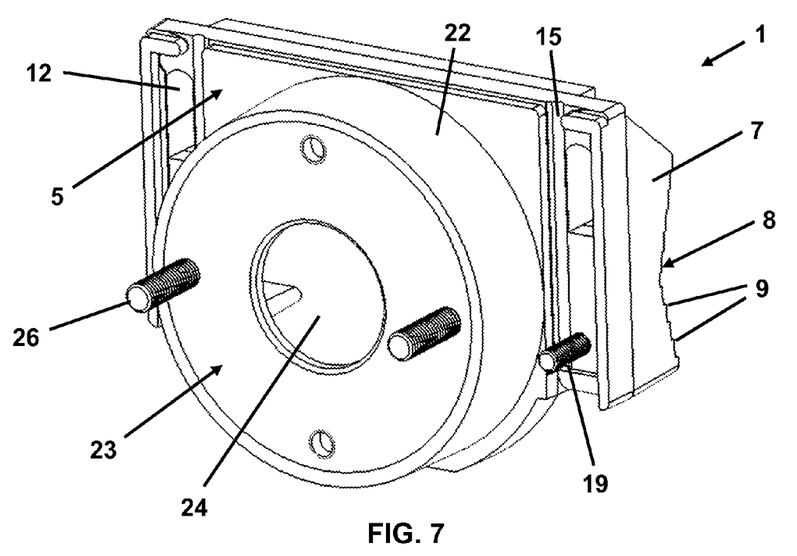
FIG. 7 is a perspective front view of the base of the traffic signal mounting bracket.
Figure 8:
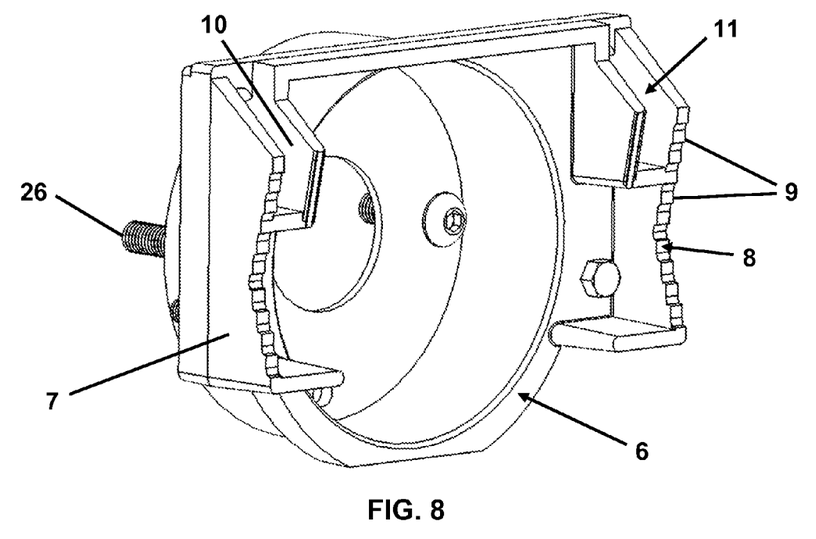
FIG. 8 is a perspective rear view of the base of the traffic signal mounting bracket.

A guide slot 12 is formed in the base 1, between each pair of flanges 7 and retaining flanges 10, and has a width sufficient to permit passage of the cable 3 therethrough. Preferably, the guide slots 12 have an elongated oval shaped cross section, as shown in FIGS. 3A, 3B, 4, and 7, defining a passage from the front 5 of the base 1, as shown in FIG. 7, to the back 6 of the base 1, as shown in FIG. 8, and aligned with the anti-rotation channel 11, as shown in FIG. 3B. Preferably, the guide slot 12 is located within the perimeter of the anti-rotation channel 11.

Figure 2A:
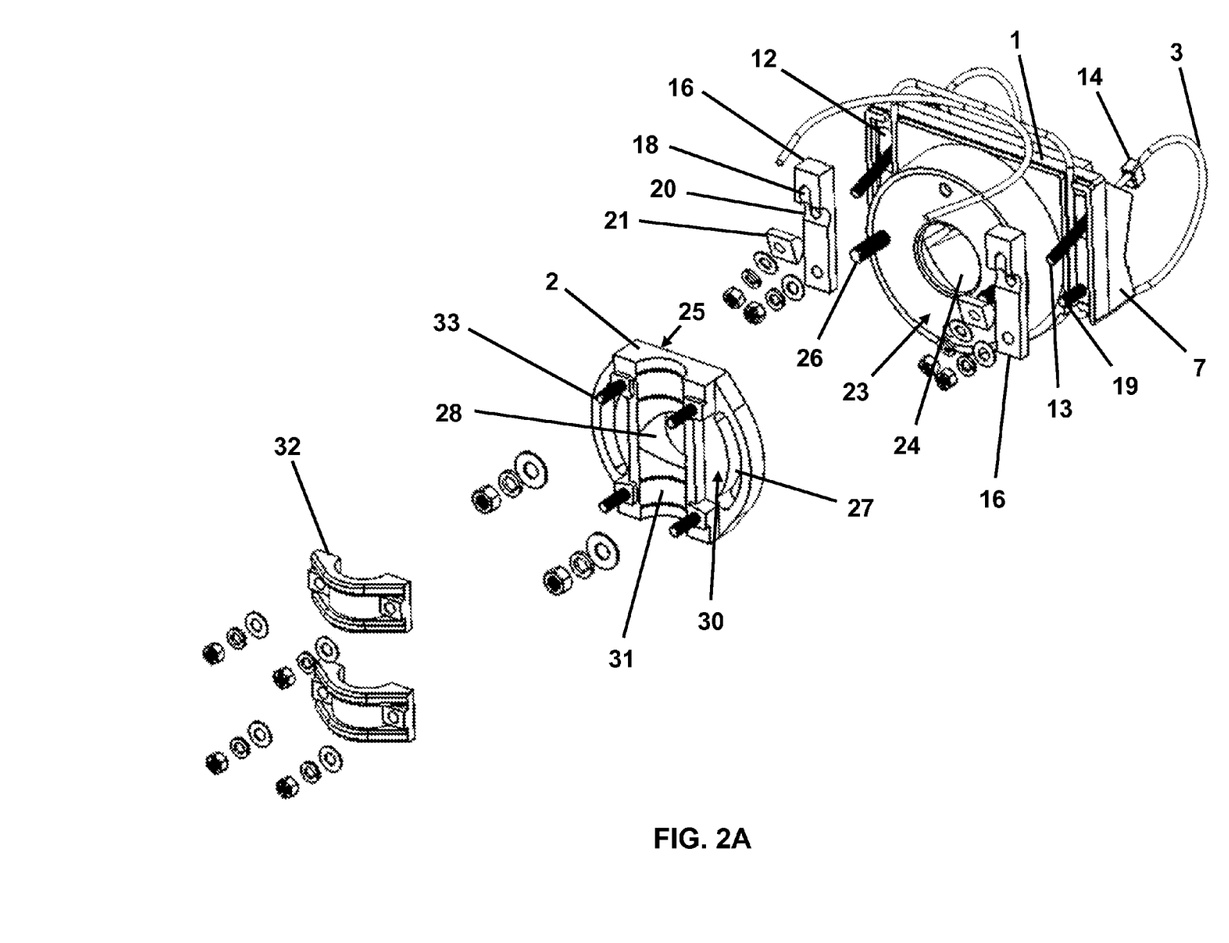
FIG. 2A is an exploded view of the traffic signal mounting bracket.
Figure 2B:
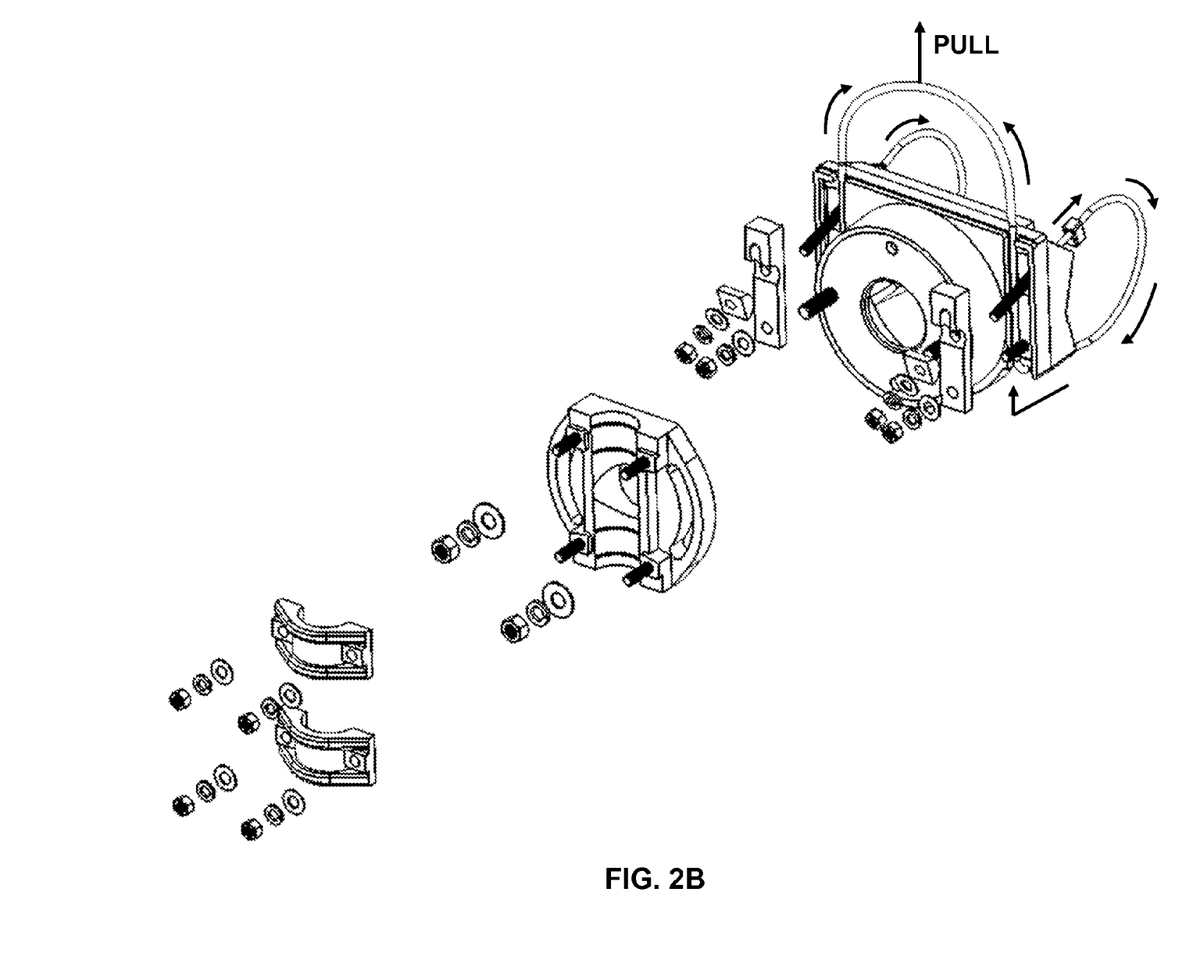
FIG. 2B is an exploded view of the traffic signal mounting bracket, showing the direction of hand pulling force, "PULL" described at paragraph.

As shown in FIGS. 2A and 2B, the bolt 13, secured on each end of the cable 3, is inserted through the guide slots 12, by way of example, from the back 6 to the front 5 of the base 1. Preferably, a single cable 3 with a bolt 13 secured on each end is used, as shown in FIG. 2B. Alternatively, two cables 3 may be used, each having a bolt 13 secured to one end, as shown in FIG. 2A. The head portion 14 on each bolt 13 is located and fits within the anti-rotation channel 11. The head portion 14 has a cross-section, or width, narrower than the width of the anti-rotation channel 11 and is sized and shaped complementary to the anti-rotation channel 11 to fit therein and prevent rotation of the head portion 14, bolt 13, and consequently the cable 3. The head portion 14 may also be sized wider than the guide slot 12, so as to prevent its passage through the guide slot 12. The head portion 14 thereby acts as a stop against the back 6 of the base 1, within the anti-rotation channel 11. Alternatively, the head portion 14 may be sized narrower than the guide slot 12, but still wider than the bolt slot 18, so as to pass through the guide slot 12, but stop against the clamping block 16, described below.

With the bolts 13 on each end of the cable 3 inserted into the guide slots 12, the cable 3 extends from the back 6 of the base 1 and is looped around the post and secured against the front 5 of the base 1. Preferably, the cable 3 is inserted into clamping grooves 15 on the front 5 of the base 1, with a middle portion of the cable 3 forming a loop, as shown in FIG. 2B. The clamping grooves 15 have a semi-circular cross-section complementary to the cable 3 and are spaced inwardly from the side edges of the base 1.

A clamping block 16, as shown in FIGS. 4, 5A, 5B, 6A, 6B, and 6C, is releasably attached to the front 5 of the base 1 over the clamping grooves 15 to secure, or clamp, the cable 3 therein between the base 1 and the clamping blocks 16. Preferably, each clamping block 16 has a complementary clamping groove 17 aligned with the clamping groove 15 on the front 5 of the base 1, with the same semi-circular cross-section, complementary to the cable 3. The clamping blocks 16 have a bolt channel 18 therethrough, which aligns with the guide slots 12 when the clamping blocks 16 are secured in place. As discussed above, the width of the bolt slot 18 is narrower than the width of the head portion 14 of the bolt 13.

Figure 1:
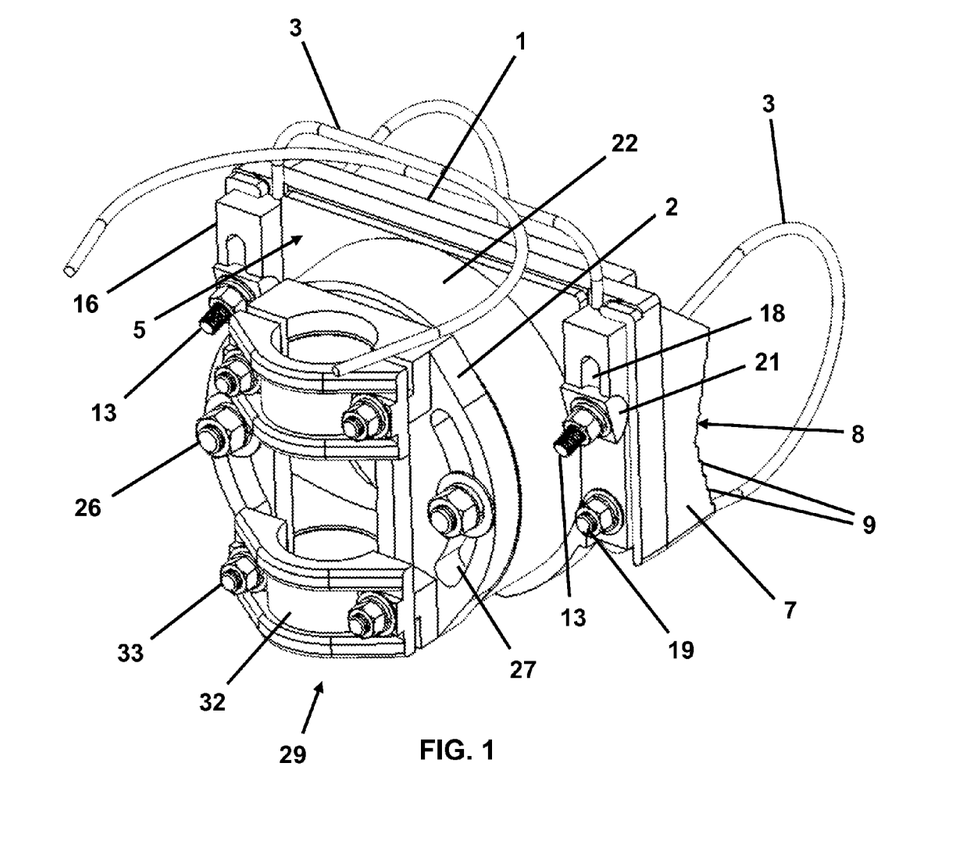
FIG. 1 is a perspective view of the traffic signal mounting bracket according to the present invention.
Figure 4:
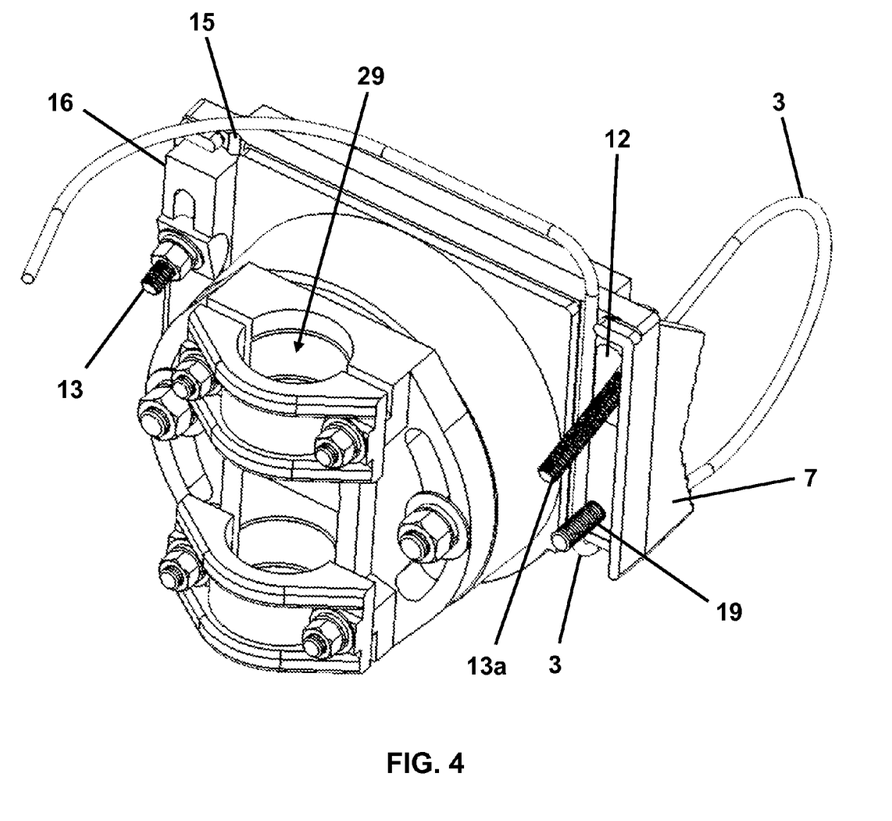
FIG. 4 is a perspective view of the traffic signal mounting bracket with one of the clamping blocks removed to expose the underlying area on the base, showing the clamping groove and the guide channel on the base.

Preferably, the clamping blocks 16 are secured to the front 5 of the base 1 on a threaded post 19, extending from the front 5 of the base 1, and the threaded portion 13a of the bolt 13, extending from the front 5 of the base 1 through the guide slot 12, as shown in FIGS. 1 and 4. When so secured with nuts or other fasteners, the clamping block 16 tensions and clamps the cable 3 between the clamping block 16 and the front 5 of the base 1. The cable 3 is thereby frictionally retained within the clamping grooves 15 and 17, preventing movement of the cable 3.

As shown in FIGS. 5A, 5B, 6A, 6B, and 6C, the clamping block 16 is provided with a bearing surface or pivot notch 20 located over the bolt slot 18. A pivot block 21, shaped complementary to the pivot notch 20, is placed on the bolt 13 by means of a central aperture, as shown in FIGS. 2A, 5A, and 5B. Preferably, the pivot notch 20 is a rounded recess and the pivot block 21 has a rounded surface shaped complementary to the pivot notch 20. Seating the pivot block 21 in the pivot notch 20 allows the bolt 13 to pivot within the guide slot 12 and bolt slot 18. The bolt 13 is thereby aligned with the cable 3, during installation, preventing kinks in the cable 3, while accommodating posts with a range of diameters.

Preferably, the front 5 of the base 1 is shaped with a cylindrical extension 22, as shown in FIGS. 1 and 7. The diameter of the cylindrical extension 22 is substantially equal to the length of the sides of the base 1. The cylindrical extension 22 extends from the front 5 of the base 1 a sufficient distance to provide clearance between the mounting surface 23 for the traffic signal attachment portion 2 on the base 1 and the attachment structures on the front 5 of the base 1, such as the threaded post 19 and the clamping block 16. This clearance ensures that the attachment structures on the front 5 of the base 1 do not extend beyond the mounting surface 23 and thereby interfere with the traffic signal mounted on the traffic signal mounting bracket.

As shown in FIGS. 2A, 3A, and 3B, the base 1 is provided with an electronics aperture 24 to permit electronic wiring to pass therethrough from the post to the traffic signal. Preferably, the electronics aperture 24 is centrally located on the front 5 and back 6 of the base 1 and has a diameter smaller than the sides of the base 1.

A traffic signal attachment portion 2 is attached to the mounting surface 23 on the base 1. Many known configurations of traffic signal attachment portion 2 may be used for attachment of various traffic signals to the base 1. By way of example, as shown in FIGS. 2A and 4, the traffic signal attachment portion 2 is generally circular and has a flat rear face 25 that abuts the mounting surface 23. Mounting posts 26 extend from the mounting surface 23 and fit within curved channels 27 through the traffic signal attachment portion 2, spaced inwardly from the peripheral edge of the traffic signal attachment portion 2. The curved channels 27 allow the traffic signal attachment portion 2 to be loosely secured to the base 1 and rotated to the desired angle, relative to the base 1 to permit proper and desired alignment of the traffic signal (not shown), before being tightly secured in place.

An electronics aperture 28 through the traffic signal attachment portion 2 is aligned with the electronics aperture 24 through the base 1, to permit electronic wiring to pass therethrough from the post to the traffic signal. Variously configured traffic signal attachment portions 2 may be used in the traffic signal mounting bracket, according to the present invention, for attachment of different types of traffic signals to the base 1. In most configurations, the traffic signal attachment portion 2 has a traffic signal engagement structure 29 positioned on the front face 30 of the traffic signal attachment portion 2. For example, as shown in FIG. 2A, the traffic signal attachment portion 2 has a groove or channel 31 positioned over the electronics aperture 28, shaped complementary a mounting pole (not shown) on a traffic signal. Clamps 32 are attached to posts 33 to secure the pole in place and, thereby, secure the traffic signal to the post.

The installation and proper positioning of a traffic signal mounting bracket, according to the present invention, may be accomplished by a two-stage tightening and tensioning method. As described above, the cable 3 is looped around the post and attached to the base 1. After an initial loose attachment of the base 1, the base 1 may be positioned at the desired location on the post and a middle portion of the cable 3 pulled tight, by hand, as shown in FIG. 2B. The cable 3 is thereafter secured by partially tightening a nut on the clamping post 19, thereby forcing the clamping blocks 16 against the front 5 of the base 1, with the cable 3 therebetween. At this stage, the traffic signal mounting bracket may still be adjusted by hand for proper positioning on the post. Once the desired positioning and alignment are achieved, final tensioning of the cable 3 may be effected by tightening the nuts on the threaded portion 13a of the bolts 13 from the front 5 of the base 1. There is no need to reach behind the bracket to hold the head portion 14, because it is rotationally secured relative to the base 1, within the anti-rotation channel 11. This constrains the bolt 13 and prevents it from rotating as a nut is tightened thereon, thereby eliminating the need for a second tool at the back 6 of the base 1.

Thereafter, the traffic signal attachment portion 2 can be secured on the mounting surface 23 and the traffic signal attached thereto. Alternatively, the traffic signal attachment portion 2 can be attached to the traffic signal prior to being secured to the mounting surface 23.

What is claimed is:

1. A traffic signal mounting bracket, for mounting a traffic signal to a post, comprising:
   a base having opposed sides, a front, and a back;
   a spacing flange on each side extending rearwardly from the back of the base and shaped to engage the post and maintain separation therebetween;
   a retaining flange extending rearwardly from the back of the base adjacent to each spacing flange defining a channel therebetween having a channel width;
   a first slot in the base aligned with each channel having a first slot width;
   a clamping block releasably attached to the front of the base overlying each first slot, having a bearing surface and a second slot aligned with the first slot having a second slot width;
   a cable having a bolt attached thereto at each end, the bolt having a head portion and a threaded portion, wherein the head portion has a width less than the channel width and greater than the second slot width, whereby the head portion is secured against rotation in the channel and secured against passage through the second slot and whereby the threaded portion extends through the first and second slots and is secured against the bearing surface by a fastener; and
   a traffic signal attachment portion configured to engage with the front of the base and the traffic signal.

2. The traffic signal mounting bracket of claim 1, wherein the front of the base and the clamping blocks each have complementary clamping grooves aligned with one another and shaped to receive and retain the cable therebetween.

3. The traffic signal mounting bracket of claim 1, wherein each clamping block releasably attaches to the front of the base by a threaded post extending forwardly from the front of the base and by a threaded portion of the bolt on one end of the cable.

4. The traffic signal mounting bracket of claim 1, wherein the bearing surface is a rounded recess and the threaded portion of the bolt is secured against the bearing surface by way of a pivot block shaped complementary to the rounded recess so as to pivot when seated therein.

5. The traffic signal mounting bracket of claim 1, wherein the first slot width is larger than the width of the head portion of the bolt.

6. The traffic signal mounting bracket of claim 1, wherein the base and the traffic signal attachment portion each have an electronics aperture therethrough and wherein the electronics apertures are aligned to permit the passage of electrical cables therethrough between the traffic signal and the post.

7. The traffic signal mounting bracket of claim 1, wherein the cable extends between the clamping blocks.

8. The traffic signal mounting bracket of claim 1, wherein the traffic signal attachment portion has two curved channels therethrough which each receive a mounting post extending forwardly from the front of the base to permit rotation of the traffic signal attachment portion relative to the base.

9. The traffic signal mounting bracket of claim 1, wherein the base comprises a cylindrical extension extending forwardly from the front of the base.

* * * * *